W. HEYSER.
ADJUSTABLE COUPLING FOR SHAFTS.
APPLICATION FILED DEC. 27, 1910.
997,062.
Patented July 4, 1911.
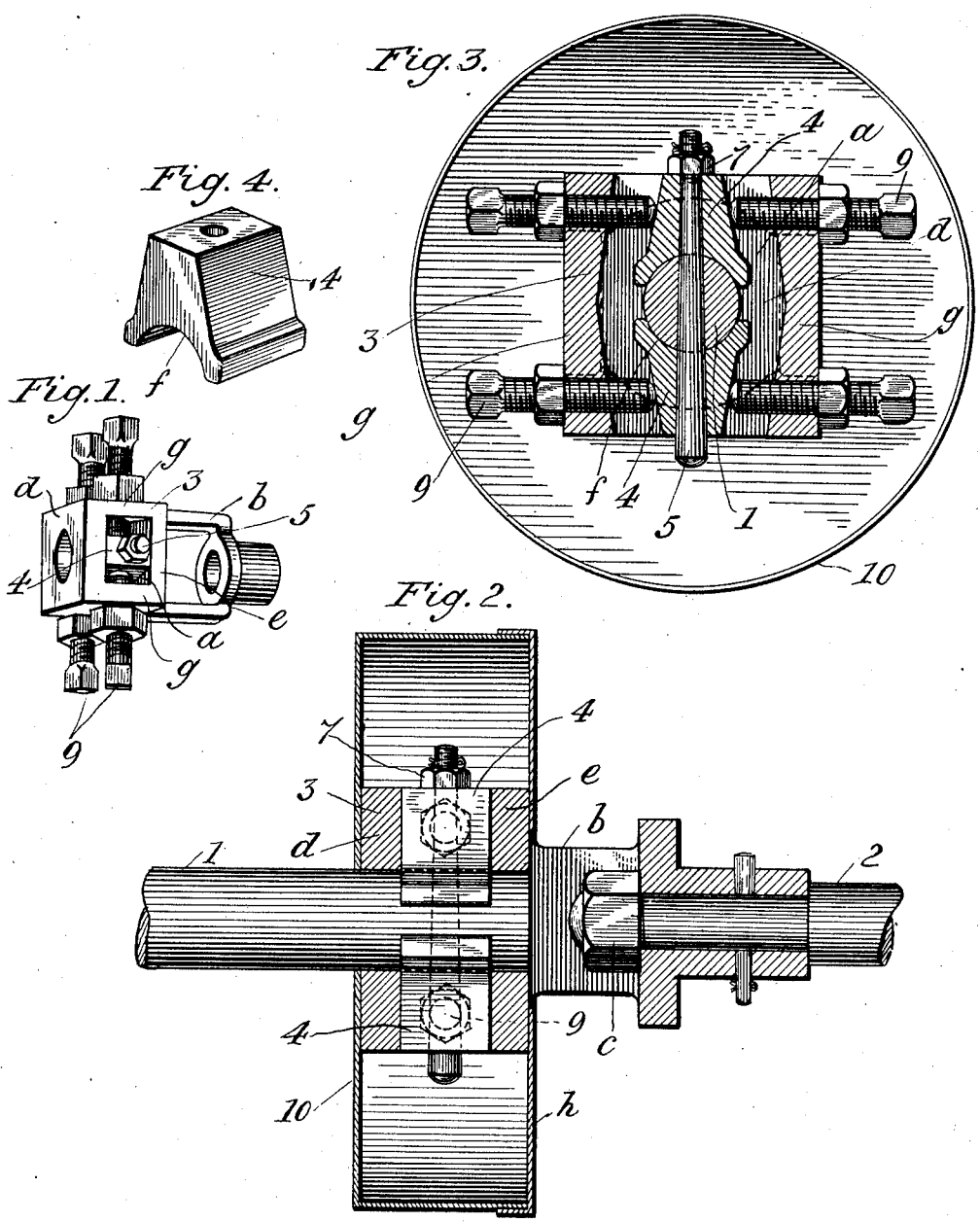
WITNESSES
INVENTOR

UNITED STATES PATENT OFFICE.

WILLIAM HEYSER, OF BALTIMORE, MARYLAND.

ADJUSTABLE COUPLING FOR SHAFTS.

997,062.  Specification of Letters Patent.  Patented July 4, 1911.

Application filed December 27, 1910. Serial No. 599,513.

*To all whom it may concern:*

Be it known that I, WILLIAM HEYSER, of the city of Baltimore and State of Maryland, have invented certain Improvements in Adjustable Couplings for Shafts, of which the following is a specification.

This invention relates to a coupling for shafts where accuracy of circumferential adjustment one with the other is required; and which, while it is adapted for a variety of purposes, is particularly adapted for coupling the driving with the magneto shaft of an internal combustion engine of an automobile wherein the igniting spark has to be produced when the crank of the engine is exactly on a dead center, and the gas in the engine cylinder at its extreme pressure, as will hereinafter fully appear.

In the further description of the said invention which follows reference is made to the accompanying drawing, forming a part hereof, and in which,—

Figure 1 is a perspective side view of the improved coupling. Fig. 2 is an enlarged longitudinal section of Fig. 1 with the addition of a protective casing which surrounds the coupling. Fig. 3 is a central cross section of Fig. 2. Fig. 4 is a perspective view of a part of the coupling.

Referring now to the drawing, 1 and 2 are shafts in longitudinal alinement. The former may represent the driving shaft of an automobile, and the latter shaft which together with certain appliances not shown, serves to produce a spark which ignites compressed gas in the engine cylinder and thereby causes an explosion in the same.

3 is a cubiform block having the opening, $a$, which extends laterally therethrough, and a longitudinally-extending open projection, $b$, which terminates in a bored collar, in which the end of the shaft 2 is inserted and secured by the nut, $c$, and a tapered pin. The walls, $d$ and $e$, of the hollow block 3 are bored to receive the shaft 1, which is free to turn therein unless prevented by certain appliances about to be described.

4, 4, are driving arms the opposing faces, $f$, of which are curved to fit the shaft 1. They are secured to the said shaft by a tapered pin 5 which passes through both blocks and the shaft, and is fastened by a nut 7 on its smaller end. The width of these driving arms corresponds with that of the opening, $a$, in the block 3, as shown in Figs. 1 and 2, so that while the said arms may turn with the shaft independently of the block 3, they will not have any longitudinal movement independently of the same.

9, 9 are screws which pass through the walls, $g$, of the block 3, and bear against the driving arms 4 to adjust the shafts 1 and 2 circumferentially one with the other, and after such adjustment, give to the said shafts a common rotary movement.

To prepare and assemble the various parts of the coupling and adjust the shafts as described, the shaft 2 is secured to the tubular collar of the extension, $b$, of the block 3, and the shaft 1 is fitted with the driving arms 4 in as near the positions which they must occupy to produce the ultimate desired result as is attainable without actual tests during the erection of the engine, after which the nice adjustment of the two shafts circumferentially one with the other is effected by means of the screws 9.

10 is a cylindrical guard which is placed around the coupling and furnished with a removable lid or cover, $h$, in order that access may be had to the coupling for repairs or further adjustment of its parts.

I claim as my invention,—

In combination with two shafts in longitudinal alinement, a coupling which consists of a laterally open hollow block into which one of the said shafts is fastened and in which the other shaft is adapted to turn; radial arms situated within the hollow block and secured to the movable shaft, and screws in the block which bear against the radial arms, whereby the two shafts can be circumferentially adjusted one with the other, and made susceptible of a common rotation, substantially as specified.

WILLIAM HEYSER.

Witnesses:
 JULIA B. ROBINSON,
 WM. T. HOWARD.

Copies of this patent may be obtained for five cents each, by addressing the "Commissioner of Patents, Washington, D. C."